(12) United States Patent
Ellenbogen et al.

(10) Patent No.: US 11,888,233 B2
(45) Date of Patent: Jan. 30, 2024

(54) TAILORED TERAHERTZ RADIATION

(71) Applicant: Ramot at Tel-Aviv University Ltd., Tel Aviv (IL)

(72) Inventors: Tal Ellenbogen, Tel Aviv (IL); Shay Keren-Zur, Tel Aviv (IL)

(73) Assignee: Ramot at Tel-Aviv University Ltd, Tel Aviv (IL)

( * ) Notice: Subject to any disclaimer, the term of this patent is extended or adjusted under 35 U.S.C. 154(b) by 411 days.

(21) Appl. No.: 16/841,871

(22) Filed: Apr. 7, 2020

(65) Prior Publication Data
US 2021/0313709 A1    Oct. 7, 2021

(51) Int. Cl.
*H01Q 21/12* (2006.01)
*G01J 3/433* (2006.01)
*G01N 21/3581* (2014.01)

(52) U.S. Cl.
CPC ............ *H01Q 21/12* (2013.01); *G01J 3/4338* (2013.01); *G01N 21/3581* (2013.01)

(58) Field of Classification Search
CPC .... H01Q 21/12; G01J 3/4338; G01N 21/3581
See application file for complete search history.

(56) References Cited

U.S. PATENT DOCUMENTS

| | | | | |
|---|---|---|---|---|
| 5,017,897 A * | 5/1991 | Ooi | ...................... | H01P 1/20381 333/204 |
| 6,310,346 B1 * | 10/2001 | Boreman | .................. | G01J 5/08 250/338.1 |
| 6,784,949 B1 * | 8/2004 | Nagata | .............. | G02F 1/136213 349/39 |
| 7,113,534 B2 * | 9/2006 | Unterrainer | ......... | H01S 3/08036 372/98 |
| 7,205,941 B2 * | 4/2007 | Wang | ....................... | H01Q 3/44 343/909 |
| 7,326,936 B2 * | 2/2008 | Kawano | .................... | G01J 5/20 250/338.2 |
| 7,446,929 B1 * | 11/2008 | Jayaraman | ............ | G02F 1/3515 359/245 |
| 7,826,504 B2 * | 11/2010 | Chen | ...................... | G02F 1/015 343/741 |
| 7,864,394 B1 * | 1/2011 | Rule | ..................... | G02F 1/0126 359/244 |
| 8,017,915 B2 * | 9/2011 | Mazin | ...................... | A61B 6/54 250/363.04 |

(Continued)

OTHER PUBLICATIONS

Lepeshov et al. (Enhancement of Terahertz Photoconductive Antenna Operation by Optical Nanoantennas, Laser Photonics Rev. 11(1)/2017).*

(Continued)

*Primary Examiner* — David P Porta
*Assistant Examiner* — Djura Malevic
(74) *Attorney, Agent, or Firm* — A.C. Entis Ltd.; Allan C. Entis

(57) ABSTRACT

Apparatus for generating THz (terahertz) radiation, the apparatus comprising: a substrate; a planar array of asymmetric point antennas formed on the substrate and excitable by a pump pulse of radiation to radiate THz radiation the point antennas having characteristic dimensions substantially smaller than wavelengths of the radiated THz; wherein the array comprises point antennas aligned in different directions.

20 Claims, 4 Drawing Sheets

(56) References Cited

U.S. PATENT DOCUMENTS

| | | | | |
|---|---|---|---|---|
| 8,115,683 B1* | 2/2012 | Stefanakos | H01Q 1/248 | 343/700 MS |
| 8,120,546 B2* | 2/2012 | Smith | H01Q 15/08 | 343/909 |
| 8,130,031 B2* | 3/2012 | Nguyen | G02B 1/002 | 327/565 |
| 8,269,168 B1* | 9/2012 | Axelrod | H01Q 15/0086 | 250/336.1 |
| 8,284,102 B2* | 10/2012 | Hayes | H01Q 25/00 | 342/374 |
| 8,304,732 B2* | 11/2012 | Kamba | G01N 21/3581 | 250/341.3 |
| 8,368,027 B2* | 2/2013 | Ishii | G01T 1/2018 | 250/366 |
| 8,450,690 B2* | 5/2013 | Averitt | G01J 5/0853 | 250/341.1 |
| 8,634,130 B2* | 1/2014 | Suh | B81C 1/00111 | 977/834 |
| 8,648,306 B1* | 2/2014 | Goertz | G02B 1/002 | 250/340 |
| 8,816,282 B2* | 8/2014 | Thiel | G01J 5/20 | 250/338.1 |
| 8,847,345 B2* | 9/2014 | Handa | G02B 5/204 | 257/292 |
| 8,848,273 B2* | 9/2014 | Yu | G02B 1/002 | 359/238 |
| 8,921,789 B2* | 12/2014 | Pryce | G01N 21/3581 | 250/338.1 |
| 9,000,376 B2* | 4/2015 | Hwang | H01L 31/09 | 250/341.1 |
| 9,000,994 B2* | 4/2015 | Shylo | H01Q 5/22 | 343/760 |
| 9,190,736 B1* | 11/2015 | Burckel | H01L 51/0008 | |
| 9,219,314 B2* | 12/2015 | Liu | H01Q 15/02 | |
| 9,488,572 B2* | 11/2016 | Sertel | G01R 31/2822 | |
| 9,502,780 B2* | 11/2016 | Chau | H01Q 9/285 | |
| 9,507,064 B2* | 11/2016 | Brongersma | G02B 1/002 | |
| 9,551,655 B2* | 1/2017 | Mazumder | G01N 21/3581 | |
| 9,551,820 B2* | 1/2017 | Metcalfe | G02B 5/3066 | |
| 9,683,928 B2* | 6/2017 | Swanson | G01B 9/02051 | |
| 9,684,221 B2* | 6/2017 | Luo | G02F 1/225 | |
| 9,733,545 B2* | 8/2017 | Belkin | G02F 1/3501 | |
| 9,739,710 B2* | 8/2017 | Schubert | G01N 21/23 | |
| 9,812,786 B2* | 11/2017 | Foo | H01Q 15/10 | |
| 9,927,517 B1* | 3/2018 | Bennett | G01S 13/88 | |
| 9,927,559 B2* | 3/2018 | Li | G02B 5/257 | |
| 9,952,557 B2* | 4/2018 | Shaltout | G02B 1/00 | |
| 9,954,286 B2* | 4/2018 | Henry | H04B 1/40 | |
| 9,960,808 B2* | 5/2018 | Henry | H01P 3/16 | |
| 9,995,859 B2* | 6/2018 | Kamali | G02B 27/4211 | |
| 10,126,466 B2* | 11/2018 | Lin | G02B 5/257 | |
| 10,161,797 B2* | 12/2018 | Shaltout | G01J 3/2803 | |
| 10,205,231 B1* | 2/2019 | Henry | H01Q 21/205 | |
| 10,288,563 B1* | 5/2019 | Ahmadivand | G01N 33/54373 | |
| 10,310,287 B2* | 6/2019 | Ellenbogen | G02B 5/008 | |
| 10,324,314 B2* | 6/2019 | Czaplewski | G02F 1/01 | |
| 10,355,368 B2* | 7/2019 | AlShareef | H01Q 1/248 | |
| 10,408,750 B2* | 9/2019 | Kondo | G01N 21/01 | |
| 10,459,258 B2* | 10/2019 | Baik | G06F 30/398 | |
| 10,520,365 B2* | 12/2019 | Favero | G01J 3/28 | |
| 10,547,116 B2* | 1/2020 | Pitsillides | H01Q 15/002 | |
| 10,620,431 B2* | 4/2020 | Yu | H01Q 21/0087 | |
| 10,620,444 B2* | 4/2020 | Kumkar | B23K 26/0622 | |
| 10,661,384 B2* | 5/2020 | Kumkar | G02B 5/1871 | |
| 10,670,782 B2* | 6/2020 | Arbabi | G02B 27/0056 | |
| 10,760,970 B2* | 9/2020 | Shaltout | G01J 3/2803 | |
| 10,820,283 B2* | 10/2020 | Davlantes | H02J 50/20 | |
| 10,838,129 B2* | 11/2020 | Lee | G02B 6/001 | |
| 10,882,143 B2* | 1/2021 | Kumkar | B23K 26/53 | |
| 10,931,004 B2* | 2/2021 | Yoo | H01Q 21/062 | |
| 11,035,548 B2* | 6/2021 | Han | G02B 5/1809 | |
| 11,112,305 B2* | 9/2021 | Jarrahi | H01L 31/02327 | |
| 11,237,103 B2* | 2/2022 | Blanchard | G01R 31/308 | |
| 2004/0208589 A1* | 10/2004 | Hobbs | G02B 6/4214 | 398/115 |
| 2005/0073744 A1* | 4/2005 | Zheludev | G02F 1/0102 | 359/486.03 |
| 2006/0085160 A1* | 4/2006 | Ouchi | H01Q 1/38 | 702/150 |
| 2006/0109541 A1* | 5/2006 | Osipov | H01Q 15/0086 | 359/321 |
| 2007/0109177 A1* | 5/2007 | Baath | G01S 13/88 | 342/124 |
| 2008/0165079 A1* | 7/2008 | Smith | B82Y 20/00 | 343/911 R |
| 2008/0198453 A1* | 8/2008 | LaFontaine | G02B 5/3075 | 359/485.01 |
| 2008/0284314 A1* | 11/2008 | Song | G09G 3/22 | 315/169.3 |
| 2009/0230333 A1* | 9/2009 | Eleftheriades | G02B 27/58 | 250/505.1 |
| 2009/0256078 A1* | 10/2009 | Mazin | A61B 6/0407 | 250/362 |
| 2009/0262766 A1* | 10/2009 | Chen | H01Q 15/0086 | 372/26 |
| 2010/0002324 A1* | 1/2010 | Rozhin | C08J 5/005 | 359/896 |
| 2010/0025586 A1* | 2/2010 | Ogawa | G01N 21/3581 | 250/341.1 |
| 2010/0054105 A1* | 3/2010 | Handa | G02B 5/008 | 369/112.01 |
| 2010/0156573 A1* | 6/2010 | Smith | H01Q 15/04 | 333/239 |
| 2010/0253997 A1* | 10/2010 | Li | G02F 1/292 | 359/319 |
| 2010/0271692 A1* | 10/2010 | Hor | G02B 1/007 | 977/773 |
| 2011/0031400 A1* | 2/2011 | Sartorius | G01N 21/3581 | 250/338.4 |
| 2011/0063054 A1* | 3/2011 | Mendis | H01P 7/06 | 333/230 |
| 2011/0227804 A1* | 9/2011 | Nilsson | H01Q 19/106 | 343/840 |
| 2012/0074323 A1* | 3/2012 | Gomez rivas | G01N 21/3581 | 250/340 |
| 2012/0113502 A1* | 5/2012 | Suh | B81C 1/00111 | 359/346 |
| 2012/0153159 A1* | 6/2012 | Kamba | G01N 21/3581 | 250/341.3 |
| 2012/0261575 A1* | 10/2012 | Averitt | H01L 27/1446 | 250/353 |
| 2013/0208332 A1* | 8/2013 | Yu | G02B 1/002 | 359/240 |
| 2013/0344290 A1* | 12/2013 | Yu | C09D 7/67 | 428/142 |
| 2014/0085693 A1* | 3/2014 | Mosallaei | G06E 3/00 | 359/107 |
| 2014/0266958 A1* | 9/2014 | Doskocil | H01Q 21/26 | 343/848 |
| 2014/0375512 A1* | 12/2014 | Knap | G01J 3/42 | 343/703 |
| 2015/0102225 A1* | 4/2015 | Sertel | G01R 31/2822 | 250/341.5 |
| 2015/0136989 A1* | 5/2015 | Kondo | G01N 21/01 | 250/341.1 |
| 2015/0192721 A1* | 7/2015 | El-Kady | G02B 5/3083 | 359/352 |
| 2015/0309218 A1* | 10/2015 | Shalaev | G02B 1/002 | 359/241 |
| 2015/0331167 A1* | 11/2015 | Escuti | G02B 5/32 | 359/3 |
| 2016/0011104 A1* | 1/2016 | Kondo | G01N 21/01 | 250/453.11 |
| 2016/0025914 A1* | 1/2016 | Brongersma | G02B 1/002 | 359/489.07 |
| 2016/0056966 A1* | 2/2016 | Bell | G06F 1/1635 | 713/310 |
| 2016/0084702 A1* | 3/2016 | Tomioka | G01J 3/42 | 250/338.3 |

(56) References Cited

U.S. PATENT DOCUMENTS

| | | | |
|---|---|---|---|
| 2016/0099758 A1* | 4/2016 | Bell | H02J 7/025 307/104 |
| 2016/0131585 A1* | 5/2016 | Xiong | G01N 21/658 436/74 |
| 2016/0197447 A1* | 7/2016 | Luo | G02F 1/225 250/504 R |
| 2016/0259175 A1* | 9/2016 | Ellenbogen | G02B 5/30 |
| 2016/0306079 A1* | 10/2016 | Arbabi | G02B 27/0025 |
| 2016/0357283 A1* | 12/2016 | Xu | G02F 1/133308 |
| 2016/0379753 A1* | 12/2016 | Jang | H01F 38/14 703/1 |
| 2017/0077736 A1* | 3/2017 | Leabman | H02J 50/80 |
| 2017/0097558 A1* | 4/2017 | Belkin | G02F 1/37 |
| 2017/0123291 A1* | 5/2017 | Vampa | G02F 1/353 |
| 2017/0131460 A1* | 5/2017 | Lin | G02B 6/005 |
| 2017/0276841 A1* | 9/2017 | Li | G02B 6/13 |
| 2017/0346565 A1* | 11/2017 | Dawson | H04B 10/1129 |
| 2017/0366242 A1* | 12/2017 | Lee | H04B 7/0408 |
| 2018/0115075 A1* | 4/2018 | Bennett | H01Q 1/50 |
| 2018/0151649 A1* | 5/2018 | Han | H01L 51/50 |
| 2018/0159228 A1* | 6/2018 | Britz | H01Q 13/02 |
| 2018/0159243 A1* | 6/2018 | Britz | H01Q 19/193 |
| 2018/0160304 A1* | 6/2018 | Liu | H01P 3/16 |
| 2018/0217395 A1* | 8/2018 | Lin | G02B 1/002 |
| 2018/0252857 A1* | 9/2018 | Glik | G02B 1/002 |
| 2018/0308259 A1* | 10/2018 | Kimura | G01N 22/02 |
| 2019/0044246 A1* | 2/2019 | Pitsillides | H01Q 3/46 |
| 2019/0103665 A1* | 4/2019 | Yoo | H01Q 15/0086 |
| 2019/0265498 A1* | 8/2019 | Ellenbogen | G02B 27/4211 |
| 2020/0111925 A1* | 4/2020 | Jarrahi | H01L 31/022408 |
| 2020/0169969 A1* | 5/2020 | Davlantes | H04W 52/283 |
| 2020/0284960 A1* | 9/2020 | Ellenbogen | G02B 1/002 |
| 2020/0404597 A1* | 12/2020 | Davlantes | H02J 50/20 |
| 2021/0141285 A1* | 5/2021 | Marandi | G02F 1/39 |

OTHER PUBLICATIONS

Bruintjes et al. (Asymmetric Shaped-Pattern Synthesis for Planar Antenna Array Hindawi Publishing Corporation International Journal of Antennas and Propagation vol. 2016, Article ID 4746381, 13 pages).*

Koutsoupidou et al. (Substrate constructed by an array of split ring resonators for a Thz planar antenna, Springer (2014)).*

Padgett, Nicholas C., "High Powered Pulsed Terahertz Light Generation from Superconducting Antenna Arrays" (2016). Browse all Theses and Dissertations. 1694.*

Maguid et al. (Photonic spin-controlled multifunctional shared-aperture antenna array; Research, Applied Optics, Jun. 3, 2016 • vol. 352 Issue 6290). (Year: 2016).*

Shengyuan Chang, Optical Metasurfaces: Progress and Applications, Annual Review of Materials Research. Mar. 21, 2018. vol. 48, pp. 279-302.

Shumei Chen, Controlling the phase of optical nonlinearity with plasmonic metasurfaces, Nanophotonics 2018; 7(6): pp. 1013-1024.

Alexander Krasnok, Nonlinear metasurfaces: a paradigm shift in nonlinear optics, Materials Today d vol. 21, No. 1 d Jan./Feb. 2018, pp. 1-14.

Yun-Han Lee, Recent progress in Pancharatnam—Berry phase optical elements and the applications for virtual/augmented realities, Opt. Data Process. Storage Mar. 2017, pp. 79-88.

Yang Bai, Fully Controllable Pancharatnam-Berry Metasurface Array with High Conversion Efficiency and Broad Bandwidth, Scientific Reports • Oct. 5, 2016, pp. 1-8.

Nishant Noolala, Ultrathin gradient nonlinear metasurface with a giant nonlinear response, vol. 3, No. 3, Mar. 8, 2016, Optica, pp. 283-288.

Shay Keren-Zur, Generation of spatiotemporally tailored terahertz wavepackets by nonlinear metasurfaces, Nature Communications 10, Apr. 16, 2019.

Shay Keren-Zur, Direct space to time terahertz pulse shaping with nonlinear metasurfaces, Optice Express 20837, vol. 27, No. 15, Jul. 11, 2019.

Eviatar Minerbi, Nonlinear Metasurface Fresnel Zone Plates for Terahertz Generation and Manipulation, Nano Letters, Jul. 29, 2019, pp. 6072-6077.

International Search Report and Written Opinion dated Aug. 10, 2021 for Application No. PCT/IL2021/050376 filed Apr. 5, 2021.

* cited by examiner

TAILORED TERAHERTZ RADIATION

FIELD

Embodiments of the disclosure relate to methods of generating and controlling terahertz radiation. The project leading to this application has received funding from the European Union's Horizon 2020 research and innovation program under grant agreement No. ERC-2016-STG.

BACKGROUND

Terahertz (THz) radiation refers to electromagnetic radiation which spans a band of frequencies defined by the International Telecommunications Union (ITU) to extend from about $3\times10^{11}$ Hz (hertz) to about $3\times10^{12}$ Hz=3 THz. Conventionally the THz band of frequencies may be considered to extend from about $10^{11}$ Hz to about $10^{13}$ Hz and span a corresponding band of wavelengths from about 3,000 μm (micrometers) to about 3 μm respectively, and associated photon energies from about 0.4 meV (millielectron volts) to about 41 meV.

THz radiation is non-ionizing and can penetrate a wide variety of non-conducting materials, and whereas it is relatively strongly absorbed by the atmosphere, THz radiation may advantageously be used for various imaging applications and fast wireless communications for ranges up to about 10 meters. By way of example, THz radiation may be advantageous for use in high resolution imaging, spectroscopy, and tomography of optically opaque objects and materials. Single cycle THz pulses may be used to acquire time-resolved and tomographic images of biological tissue. And THz radiation may be used to probe and manipulate low energy degrees of freedom in materials, such as rotations in molecules, vibrations in molecular crystals, hydrogen bonds, semiconductor excitons, and spin waves in magnetic materials.

However, generating and configuring THz radiation for the many various applications for which the radiation may advantageously be used, is generally a complex endeavor that typically involves large and expensive equipment. As a result adoption of systems and technologies that use THz has been slowed.

SUMMARY

An aspect of an embodiment of the disclosure relates to providing nonlinear metasurfaces (NLMs) for generating and controlling the spatial and temporal shape of THz radiation that are relatively small and inexpensive, easy to use, and flexibly adaptable to provide different configurations of THz pulse.

In an embodiment of the disclosure an NLM comprises a substrate having formed on a surface thereon an array of THz "point antennas" that are excitable by femtosecond, optionally near infrared (NIR) radiation to radiate THz radiation at wavelengths that are very large compared to a characteristic size of the point antennas. The point antennas are spatially positioned and oriented in different directions and/or concentrations so that they may be excited by a relatively low energy NIR pump pulse to radiate THz waves at different relative phases and amplitudes that superpose in the far-field of the NLM to generate a desired spatial and temporal pattern of THz radiation. Optionally, the point antennas are planar, mirror image asymmetric antennas formed from a metal and/or dielectric material that exhibit surface plasmon resonances (SPR) when illuminated by the pump beam. In an embodiment the point antennas are metallic split ring resonators (SRR).

In an embodiment of the disclosure an NLM may comprise a rectilinear array of rows and columns of same SRRs in which each column comprises SRRs oriented in a same direction. The columns may be configured in groups, each group comprising a column of SRRs or a plurality of adjacent columns of SRRs for which the SRRs in all the columns are oriented in a same direction, and for which SRRs in adjacent groups are rotated relative to each other optionally by 180°. When illuminated by a pump pulse of NIR radiation, the NLM array generates a diffracted THz radiation pulse, which propagates away from the NLM and is characterized by an electric field, "E", having intensity that exhibits a plurality of temporal cycles. A number of the plurality of temporal cycles in the THz pulse may be equal to a number of orientation change cycles, also referred to as orientation modulation cycles, that the SRRs in the NLM exhibits. A distance that spans an orientation modulation cycle may be referred to as a period of the orientation cycle.

NLMs in accordance with an embodiment of the disclosure are not limited to rectilinear arrays of point antennas. By way of example an NLM may be configured as a Fresnel zone plate (FZP) comprising concentric, circular bands of SRRs. The SRRs in a same band are optionally oriented in a same azimuthal direction relative to an optic axis that passes through a center of the FZP. SRRs in adjacent bands of SRRs are oriented to face in opposite directions. When excited with a NIR pump pulse, the NLM, hereinafter also referred to as an NLM-FZP, generates a pulse of THz radiation in which different frequencies of the THz are focused to the optic axis of the NLM-FZP at different distances from the NLM-FZP.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

DETAILED DESCRIPTION

Figure 1:
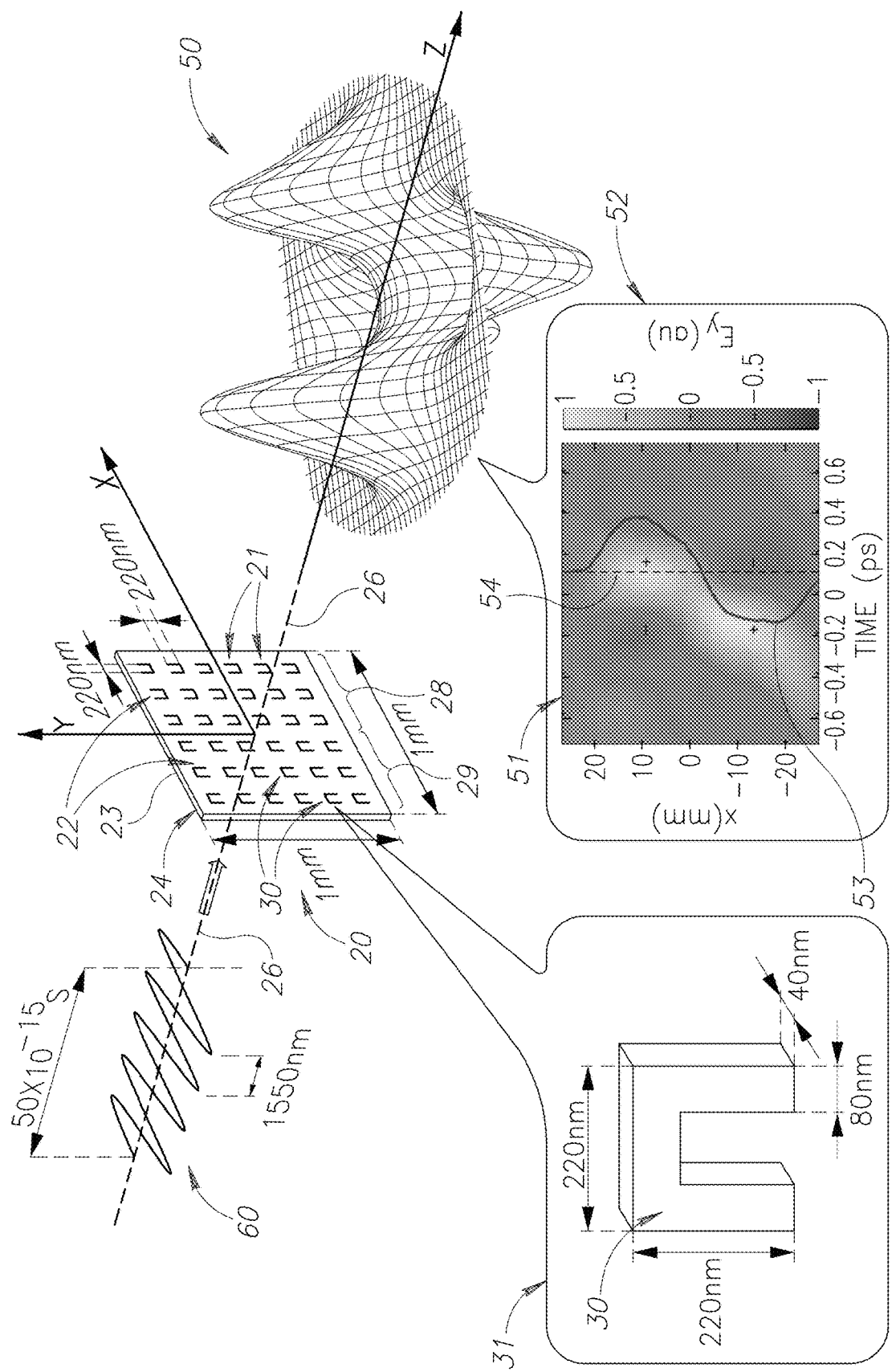
FIG. 1 schematically shows an NLM comprising a single orientation modulation cycle of SRRs being excited by a NIR femtosecond pump pulse to transmit a THz quadrupole pulse, in accordance with an embodiment of the disclosure.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins FIG. 1 schematically shows a NLM 20 optionally comprising parallel rows 21 and columns 22 of C1 point antennas, optionally U-shaped split-ring resonators 30 (U-SRRs), formed on a surface 23 of a substrate 24 to exhibit changes in orientation, in accordance with an embodiment of the disclosure. NLM 20 is shown being used to generate a pulse 50 of THz radiation responsive to being illuminated by an NIR pump pulse 60, in accordance with an embodiment of the disclosure. Features of NLM 20 and radiation interacting with the NLM are referenced for convenience with respect to a Cartesian coordinate system 26. Rows 21 and columns 22 of U-SRRs 30 are respectively parallel to the x and y axes of coordinate system 26. Surface 23 of substrate 24 on which U-SRRs 30 are formed may be referred to as a face of NLM 20 and is assumed to be located at z=0 and lie on the x-y plane of coordinate system 26. An optic axis of NLM 20 indicated by a dashed line 27 is coincident with the z-axis.

In an example embodiment of NLM 20, substrate 24 comprised a layer of indium tin-oxide layer (not shown) formed on a 1 mm×1 mm square glass plate, and U-SRRs 30 were patterned from gold on the indium tin-oxide layer by nanofabrication lithography. Each U-SRR 30, as schematically shown in an inset 31 was formed as an optionally substantially square-shaped "U" having width and height equal to about 220 nm (nanometer), arm and base widths equal to about 80 nm and thickness of about 40 nm. U-SRRs 30 along a row 21 and along a column 22 were spaced one from the other by about a same distance equal to about the width, 220 nm, of the U-SRRs. All U-SRRs 30 in a same column 22 were oriented in a same direction, optionally with their respective open ends facing the plus y-direction or all their open ends facing the minus y-direction. U-SRR resonators 30 in a first group 28 of adjacent columns 22 located at positive x-coordinates on face 23 of substrate 24 were oriented with their open ends facing the plus y-direction. U-SRRs 30 in a second group 29 of adjacent columns 22 located at negative x-coordinates on face 23 were oriented with their open ends facing the minus y-direction. Optionally, the first and second groups 28 and 29 of columns comprised a same number of columns.

In an experiment to generate THz radiation NIR pump pulse 60 was directed along optic axis 26 to illuminate face 23 of NLM 20 on which U-SRRs 30 were formed. NIR pump pulse 60 was a 50 femtosecond ($10^{-15}$ s), 3.5 mJ (millijoule) NIR pulse polarized along the x-axis. The pump pulse had a central frequency equal to about $2 \times 10^{14}$ Hz, and a corresponding central wavelength of about 1550 nm. The central wavelength is about 7 times larger than the dimension of about 220 nm characterizing U-SRRs 30. On face 23 (z=0) the x-polarized electric field, $E_x^{NIR}(x,y,z=0)$, of pump pulse 60 had a Gaussian cross section, $$E_x^{NIR}(x,y,z=0) = |E_x^{NIR}|^2 e^{-(x^2+y^2)/w^2}, \quad (1)$$

where $|E_x^{NIR}|$ is a maximum amplitude of the x-polarized E field in pump pulse 60, (x, y) are coordinates of a location on face 23 of NLM 20 at which energy in pump pulse 60 is incident, and w, which was equal to about 0.85 mm, is the radius of the Gaussian distribution.

Pump pulse 60 excited point antennae U-SRRs 30 to generate a THz electric field, $E_y^{THz}(x,y,z\sim 0)$ along surface 23 of NLM 20 polarized substantially parallel to the y-axis. $E_y^{THz}(x,y,z\sim 0)$ may be represented by an expression, $$E_y^{THz}(x,y,z\sim 0) = A_{yxx}\text{sign}(x)|E_x^{NIR}|^2 e^{-(x^2+y^2)/w^2}, \quad (2)$$

where $A_{yxx}$ is a third order, non-linear response tensor that characterizes the configuration of U-SRRs 30 and maps the intensity of pump pulse 60 at location (x,y) to the THz field $E_y^{THz}(x,y,z\sim 0)$. The function, sign(x), returns the sign of the x-coordinate at which energy in the pump field $E_x^{NIR}(x,y,z\sim 0)$ is incident on face 23 of NLM 20. The sign function accounts for a phase reversal of the output THz electric field $E_y^{THz}(x,y)$ at coordinates (x,y) due to the 180° reversal of orientation of U-SRRs 30 located at positive x-coordinates relative to orientation of U-SRR point antennas 30 located at negative x-coordinates.

Electric field $E_y^{THz}(x,y, z\sim 0)$ that NIR pump pulse 60 excited in NLM 20 radiated THz energy that propagated away from NLM 20 along optic axis 26 to the far field of NLM as THz pulse 50. The electric field in THz pulse 50 was substantially polarized in the y-direction and exhibited a quadrupole spatial form as schematically indicated in FIG. 1. A spatiotemporal gray level mapping 51 of magnitude of the electric field $E_y^{THz}(x,y,z)$ in THz pulse 50, for y=0 as a function of displacement x along the X axis following collimation of the pulse by a parabolic mirror (not shown) is given in an inset 52. The values for $E_y^{THz}(x,y=0,z)$ indicated in the mapping were acquired for THz pulse 50 as a function of x and time t. The mapping shows that the pulse had a temporal extent of about 1.2 ps (picoseconds) and a corresponding spatial extent in the z-direction along optic axis 26 of about 360 μm. In the x direction the collimated THz pulse 50 had an extent of about 40 mm. A curve 53 in mapping 51 shows the magnitude of $E_y^{THz}(x,y=0,z)$ as a function of x along a dashed line 54 corresponding to time 0.1 ps.

The expression for $E_y^{THz}(x,y,z=0)$ given by equation (2) may be expanded into a series of two dimensional Hermite-Gauss functions $HG_{i,j}$ for which a $HG_{10}$ component of the series is largest and contributes most to $E_y^{THz}(x,y,z=0)$ relative to the other terms in the series. The form of THz quadrupole pulse 50 as measured in the experiment and shown in FIG. 1, and an amount of energy that the pulse carried way from NLM 20 is consistent with the $HG_{10}$ component of $E_y^{THz}(x,y, z=0)$ being the source of THz pulse 50.

It is noted as discussed above, that NLM 20, which generated single cycle, quadrupole THz pulse 50 responsive to NIR pump pulse 60 is configured having one orientation modulation cycle, optionally an orientation reversal cycle, of U-SRRs 30, the cycle having a 1 mm spatial period along the x-axis in the NLM. However, practice of embodiments of the disclosure is not limited to single cycle modulation of orientation of point antennas in an NLM. For example, an NLM, which may be referred to as a multicycle NLM (M-NLM), may comprise a plurality of "M" spatial orientation modulation cycles of U-SRRs, and be advantageous for generating a multicycle THz pulse characterized by "M" cycles in magnitude of an electric field $E^{THz}(M, x,y,z)$ of the M-THz pulse.

Figure 2A:
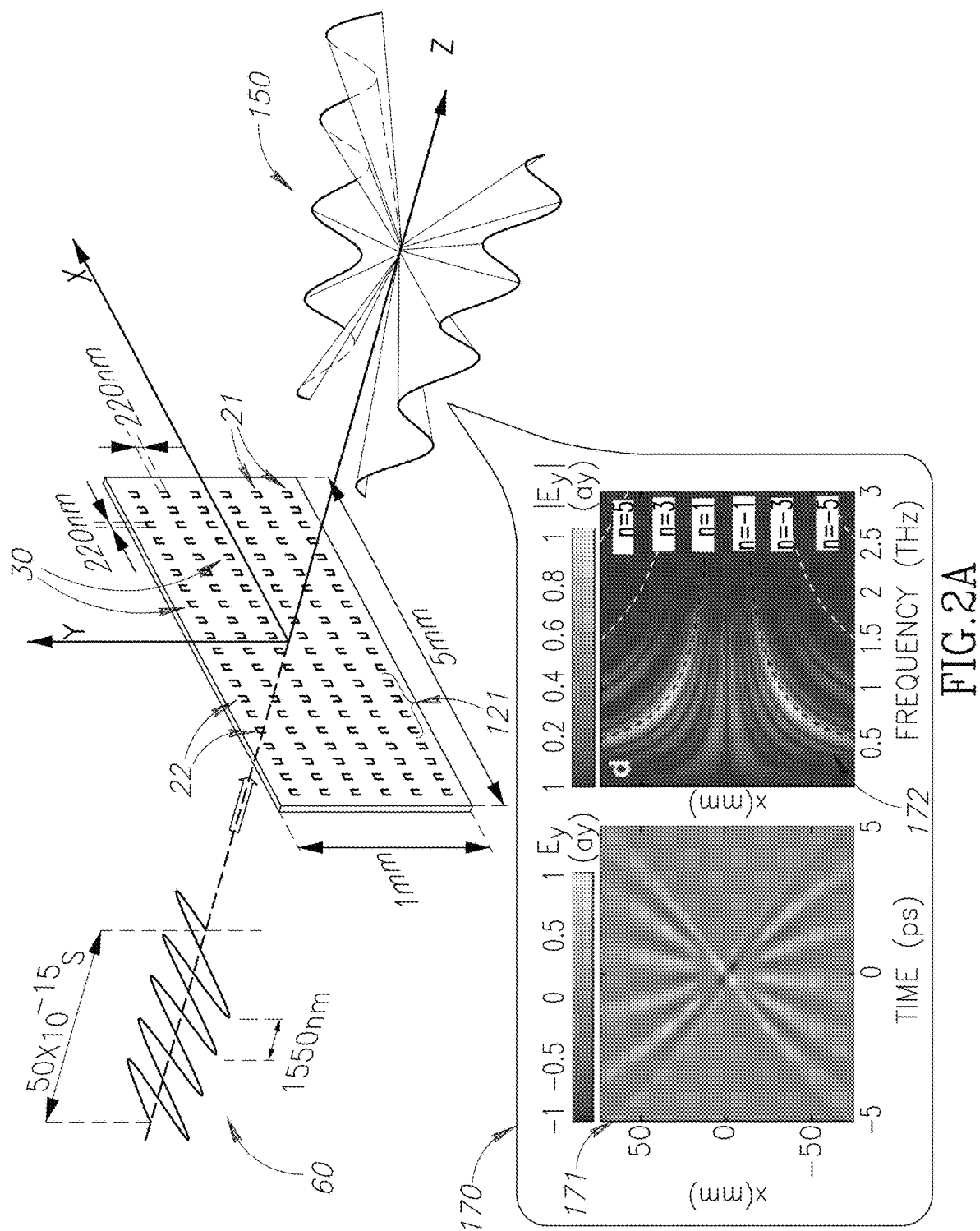
FIG. 2A schematically shows an NLM having five orientation modulation cycles of SSRs, generating a five cycle THz pulse of radiation in response to an incident NIR pump pulse, in accordance with an embodiment of the disclosure.

By way of example, FIG. 2A schematically shows a multicycle NLM, M-NLM 120 in accordance with an embodiment of the disclosure. M-NLM 120 optionally comprises parallel rows 21 and columns 22 of evenly distributed C1 point dipoles, optionally U-SRRs similar to U-SRRs 30 shown in FIG. 1. The U-SRRs exhibit M=5 orientation change, optionally orientation reversal, spatial modulation cycles along the x-direction. When illuminated by an x-polarized NIR pump pulse similar to NIR pump pulse 60 (FIG. 1) that excites the SRRs, M-NLM 120 generates a multicycle M-THz pulse 150 of radiation that propagates away along an optic axis 26 of N-NLM 120 to the M-NLM far field and has an E field, $E_y^{THz}(M=5, x,y,z)$, that exhibits 5 cycles in magnitude.

An embodiment of, M-NLM 120 was formed on a 5 mm×1 mm substrate comprising five orientation modulation cycles of U-SRRs 30, each cycle comprising a first group of U-SSR columns 22 in which the open ends of the U-SRRs 30 face the minus y-direction, adjacent a second group of U-SSR columns 22 in which the U-SRRs 30 face the opposite, plus y-direction. The modulation cycles had a period Λ optionally to about 1 mm. An orientation modulation cycle of U-SRRs in M-NLM 120 is represented by two columns 22 of U-SRRs 30 facing the plus y-direction adjacent 2 columns 22 of U-SRRs 30 facing the minus y-direction. A modulation cycle of the modulation cycles shown in in M-NLM 120 is indicated by a bracket 121. It is noted that whereas the indicated modulation cycle 121 is shown have four columns of U-SRRs 30, two "up-facing" adjacent two "down-facing" columns, practice of an embodiment of the disclosure is not limited to modulation cycles having four columns, an equal number of up-facing and down-facing columns, or modulation cycles having a period of about 1 mm. Nor is practice of an embodiment of the disclosure limited to modulation cycles in which C1 point antenna reverse direction and/or are evenly distributed in an NLM. In response to normal illumination by NIR pump pulse 60 along optic axis 26, M-NLM 120 radiated five cycle multicycle M-THz pulse 150 schematically represented in FIG. 2A. Features exhibited by M-THz pulse 150 are quantitatively estimated in gray level mappings 171 and 172 shown in an inset 170.

Gray level mapping 171 shows magnitude of $E_y^{THz}(M=5, x,y,z)$ time resolved along a time abscissa scaled in picosecond displacement from a center of M-THz pulse 150, and spatially resolved along the ordinate in mm of displacement along the x-axis. Time displacement t corresponds to a spatial displacement d from a center of the pulse, where d satisfies a relationship d=ct, and c is the speed of light. Brighter regions of mapping 171 indicate larger magnitudes than darker regions of the mapping.

Gray level mapping 172 maps relative amplitude of frequency components in electric field $E_y^{THz}(M=5,x,y,z)$ of M-THz pulse 150 indicated along the abscissa of the mapping to displacement in mm along the x-axis of coordinate system 26 shown along the ordinate of the mapping (shown for mapping 171). It is noted that because of the cyclical configuration of bands of U-SRRs 30, which reverse orientation with a period Λ, wavelengths of THz radiation that pump pulse 60 generated by exciting U-SRRs 30, propagate away from M-NLM 120 in wavelength dependent angular directions. The wavelength dependent directions may be described by the Raman-Nath diffraction relation, $$\sin \theta_n = n\lambda_{THz}/\Lambda = nc/\Lambda\nu. \quad (3)$$

In equation (3) $\lambda_{THz}$ is the wavelength of a plane wave of the generated THz radiation, $\nu$ is a frequency corresponding to $\lambda_{THz}$, c is the speed of light, n is an integer designating a diffraction order of the wavelength, and $\theta_n$ is an angle in which the diffracted THz radiation plane wave propagates. Dashed lines in gray level mapping 172 are associated with different diffraction orders n. Each dashed line is labeled with the given diffraction order n with which it is associated and for the given diffraction order relates, amplitude of THz radiation in M-THz pulse 150 as a function of frequency shown along the abscissa to x-coordinates shown along the ordinate. Intensity of the gray level mapping at a given location along the dashed line indicates for a frequency, "ν", shown along the abscissa, relative magnitude of E field amplitude of radiation in M-THz pulse 150 for the given diffraction order that propagates to an x-coordinate shown along the ordinate. The x-coordinate corresponds to an angle of propagation for radiation at the frequency ν and given diffraction order. Brighter regions of mapping 172 indicate larger magnitudes than darker regions of the mapping.

Figure 2B:
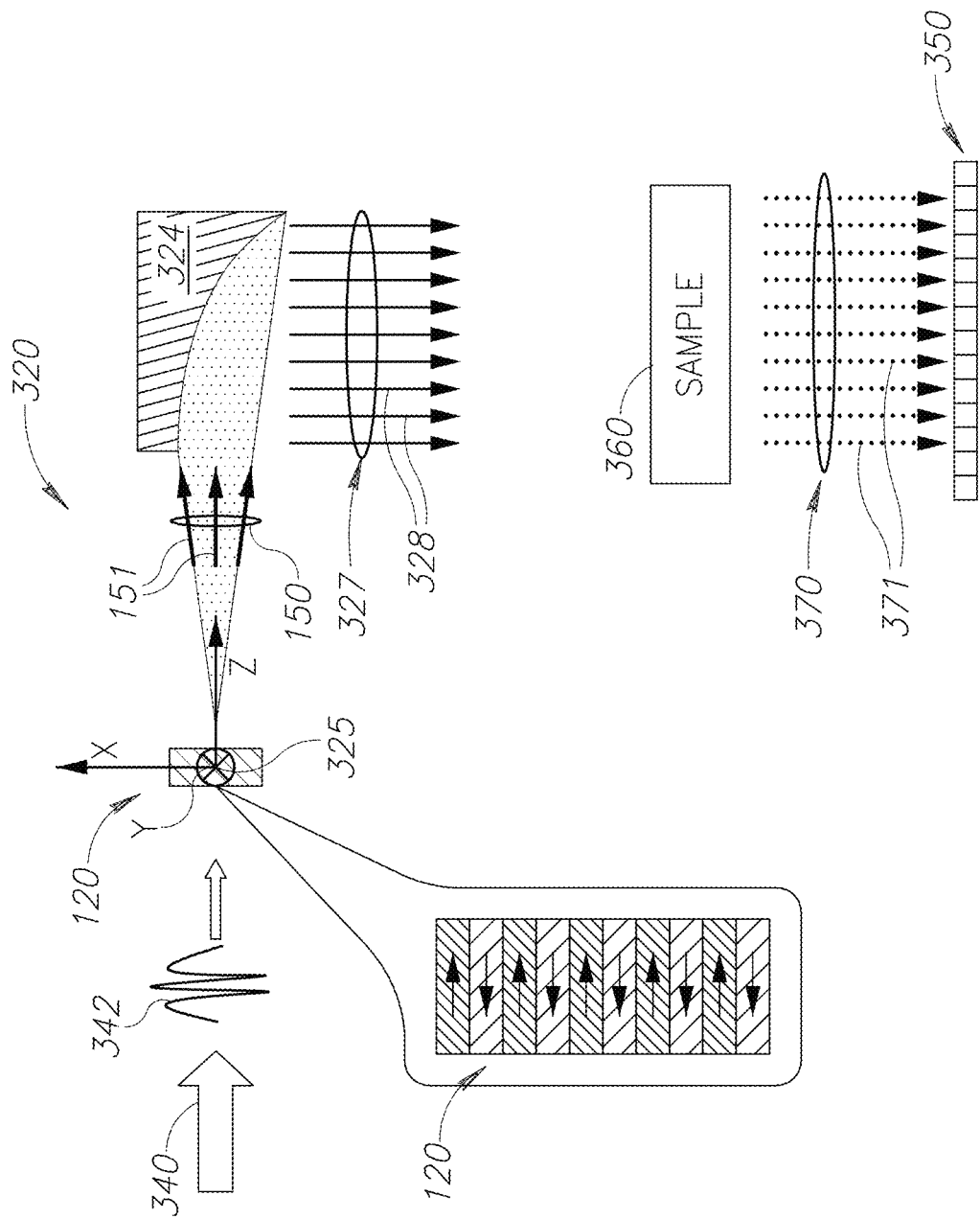
FIG. 2B schematically shows a spectrometer comprising the NLM shown in FIG. 2A, in accordance with an embodiment of the disclosure.

FIG. 2B schematically shows a very simplified plan view from a perspective of the y-axis of a THz spectrometer 320 comprising an M-NLM 120, shown enlarged in an inset 322 from a point of view along the z-axis, in accordance with an embodiment of the disclosure. Spectrometer 320 optionally comprises a parabolic mirror 324 having a focal point 325 located at M-NLM 120, a laser source 340 controllable to illuminate M-NLM 120 with femtosecond pulses of near NIR light and a radiation detector 350. Optionally, radiation detector 350 is configured to detect intensity of incident radiation as a function of location of incidence of the radiation on the detector.

By way of example, THz spectrometer 320 is shown being used to determine an attenuation coefficient as a function of THz frequency for a material sample 360 and laser source 340 is schematically shown illuminating M-NLM 120 with a femtosecond NIR light pulse 342, optionally similar to pulse 60 (FIG. 2A). NIR pulse 342 excites M-NLM 120 to radiate THz radiation, which propagates from a region of M-NLM 120 including focal point 325 to propagate to parabolic mirror 324 along angular directions that substantially satisfy the Raman-Nath diffraction relation, equation (3), in a THz diffracted pulse represented by an ellipse 150 encircling arrows 151. THz radiation in THz pulse 150 propagates in angular directions that substantially satisfy the Raman-Nath diffraction relation, equation (3) and as a result, as discussed above, radiation at different propagation angles in pulse 150 are characterized by different THz frequencies.

Parabolic mirror 324 collimates radiation in THz radiation pulse 150 that the mirror receives to a THz pulse of radiation represented by an ellipse 327 encircling arrows 328, which propagates to and is incident on sample 360. THz pulse 327 encodes the frequencies of radiation propagating in different angular directions in THz pulse 150 to radiation propagating parallel to the minus x-axis for different corresponding values of y,z coordinates. THz pulse 327 thus encodes the different THz frequencies generated by excitation of M-NLM 120 to different y,z, coordinates of a cross section of THz pulse 327.

Sample 360 attenuates radiation in incident THz pulse 327 by absorption and/or scattering to provide an attenuated THz pulse, schematically represented by an ellipse 370 enclosing dashed arrows 371 that exits the sample and is incident on detector 350. Detector 350 generates signals responsive to the intensity of radiation in attenuated THz pulse 370 as a function of y,z location of incidence on the detector and therefore as a function of y,z coordinates in the cross section of pulse 370 and frequencies of THz radiation corresponding to the y,z locations. The signals and known intensity of radiation in pulse 150 may be processed to determine the attenuation coefficient of sample 360 as a function of THz frequency provided by M-LNM 120.

As for the case of NLM 20, the E field $E_y^{THz}$(M=5, x,y,z) at z=0 for M-NLM 120 generated by NIR pump pulse 60 may be related, in accordance with an embodiment of the disclosure, to the spatial configuration and characteristics of point antennas U-SRRs 30 in M-NLM 120 by an equation similar to equation (2). Equation (2) may be generalized and manipulated to provide an indication as to how to configure an NLM to provide a desired pulse of THz radiation in a far field of the NLM. For example, assuming that an E field $\mathbf{E}^{THz}$(x,y,z=0,t), where bold script indicates a vector, which a pump pulse generates on a surface (z=0) of an NLM is separable, $\mathbf{E}^{THz}$(x,y,z,t) may be given in accordance with an embodiment of the disclosure by an expression $$E^{THz}(x,y,z=0,t) \propto s(x,y,z=0)f(t). \quad (4)$$

In equation (4) s(x,y,z), which may be referred to as a "configuration function", characterizes spatial configuration of point antennas in the NLM and their respective responses to features of the pump pulse for a given predetermined pump pulse configuration.

Assume for convenience of presentation, without loss of generality, that s(x,y,z=0) is independent of y and that $\mathbf{E}^{THz}$(x,y,z=0,t) comprises only one component, $E^{THz}$(x,z=0, t) so that expression (4) may be simplified to $$E^{THz}(x,z=0,t) \propto s(x)f(t). \quad (5)$$

Let $S(k_x) = \mathcal{F}s(x) = (1/\sqrt{2\pi})\int s(x)e^{-ik_x x}dx \quad (6)$ and where $\mathcal{F}$ indicates the Fourier transform so that $$s(x) = \mathcal{F}^{-1}(1/\sqrt{2\pi})\int S(k_x)e^{ik_x x}dk_x \quad (7)$$

and let $$F(\omega) = \mathcal{F}f(t) = (1/\sqrt{2\pi})\int f(t)e^{i\omega t}d\omega \quad (8)$$

So that $$f(t) = \mathcal{F}^{-1}F(\omega) = (1/\sqrt{2\pi})\int F(\omega)e^{-i\omega t}d\omega \quad (9)$$

then $$E^{THz}(x,z=0,t) \propto s(x) \cdot f(t) = (1/2\pi)\int d\omega \int dk_x S(k_x)F(\omega)e^{i(k_x x - \omega t)} \quad (10)$$

After propagating from z=0 to the far field at a distance z along the z axis, the field given by (10) becomes $E^{THz}$(x,z,t), which may be given by an expression, $$E^{THz}(x,z,t) \propto (1/2\pi)\int d\omega \int dk_x S(k_x) F(\omega)e^{i(k_x x - \omega t)}e^{iz\sqrt{(\omega/c)^2 - k_x^2}} \quad (11)$$

A component of $E^{THz}$(x,z=0,t) having angular frequency ω propagates to the far field at an angle θ that satisfies the relation $$k_x = \omega \cdot \sin\theta/c. \quad (12)$$

The electric field at a given location (x,z) for which x=z·tan θ, may therefore be expressed as the superposition of waves having angular frequency ω that are radiated from the NLM and satisfy expression (12). $E^{THz}$(x,z,t) at the given far field location may therefore be given by the integral, $$E^{THz}(x=z\cdot\tan\theta,z,t) = (1/2\pi)\int d\omega \int dk_x S(k_x) F(\omega)e^{i(k_x x - \omega t)}e^{iz\sqrt{(\omega/c)^2 - k_x^2}}\delta(k_x - \omega\cdot\sin\theta/c). \quad (13)$$

where δ is the Dirac delta function.

Integrating expression (13) over $dk_x$ results in $$E^{THz}(x=z\cdot\tan\theta,z,t) = (1/2\pi)\int d\omega S(\omega \sin\theta/c) F(\omega)e^{-i\omega(t-z/(c\cdot\cos\theta))}. \quad (14)$$

Setting $t_o \equiv z/(c\cdot\cos\theta)$ expression (14) may written $$E^{THz}(x=z\cdot\tan\theta,z,t) = (1/2\pi)\int d\omega S(\omega\cdot\sin\theta/c) F(\omega)e^{-i\omega(t-t_o)}, \quad (15)$$

which may be rewritten as a Fourier transform, $$E^{THz}(x=z\cdot\tan\theta,z,t) = \mathcal{F}[S(\omega\cdot\sin\theta/c)F(\omega)e^{i\omega t_o}]. \quad (16)$$

Noting that that S(ω sin θ/c) is the Fourier transform of s(x) with the independent variable x identified as the conjugate to ω scaled by a factor c/sine, and that $F(\omega)e^{i\omega t_o}$ is the Fourier transform of $f(t-t_o)$, $E^{THz}$(x=z·tan θ, z, t) given in (16) may be written as the convolution $$E^{THz}(x=z\cdot\tan\theta,z,t) = s(ct/\sin\theta) * f(t-t_o) \quad (17)$$

Equation (17) and the convolution theorem, may be used in accordance with an embodiment of the disclosure to determine a spatial configuration of point antennas for an NLM, which when excited radiates a desired THz pulse to the far field of the NLM. For example, assume a desired THz pulse defined in the far field by an E field, $E^{THz}$(x, z, t). From equation (17) and the convolution theorem:

$$\mathcal{F}E^{THz}(x,z,t) = \mathcal{F}[s(ct/\sin\theta) * f(t-t_o)] = \mathcal{F}s(ct/\sin\theta) \cdot \mathcal{F}f(t-t_o) \quad (18)$$

Then for t=x sin θ/c, $$s(x) = \mathcal{F}^{-1}\{\mathcal{F}E^{THz}(x,z,t)/\mathcal{F}f(t-t_o)\}|_{x\sin\theta/c} = \mathcal{F}^{-1}\{\mathcal{F}[s(x)*f(x\sin\theta/c - t_o)]/\mathcal{F}f(x\sin\theta/c - t_o)\} = \mathcal{F}^{-1}\mathcal{F}s(x). \quad (19)$$

Whereas NLM 120 and M-NLM 120 are described as comprising rectilinear configurations of substantially same C1 SRR point antennas U-SRRs 30 having substantially homogeneous density distribution on a surface of a substrate, practice of embodiments of the disclosure is not limited to same point antennas, rectilinear configurations of C1 SRR point antennas, or point antennas having homogeneous density distributions. The configuration function s(x, y,z) discussed above contemplates that an array of point antennas in an NLM in accordance with an embodiment may by way of example comprise antennas of different types, different orientations, variable density distribution, and different responses to a same pump pulse. For example, intensity and/or phase of E field $E_y^{THz}$(x,y,z=0) as a function of location (x,y) in an NLM generated responsive to a given pump pulse may be controlled by distribution density of the point antennas, their respective types, sizes, shapes and/or orientations.

Figure 3:
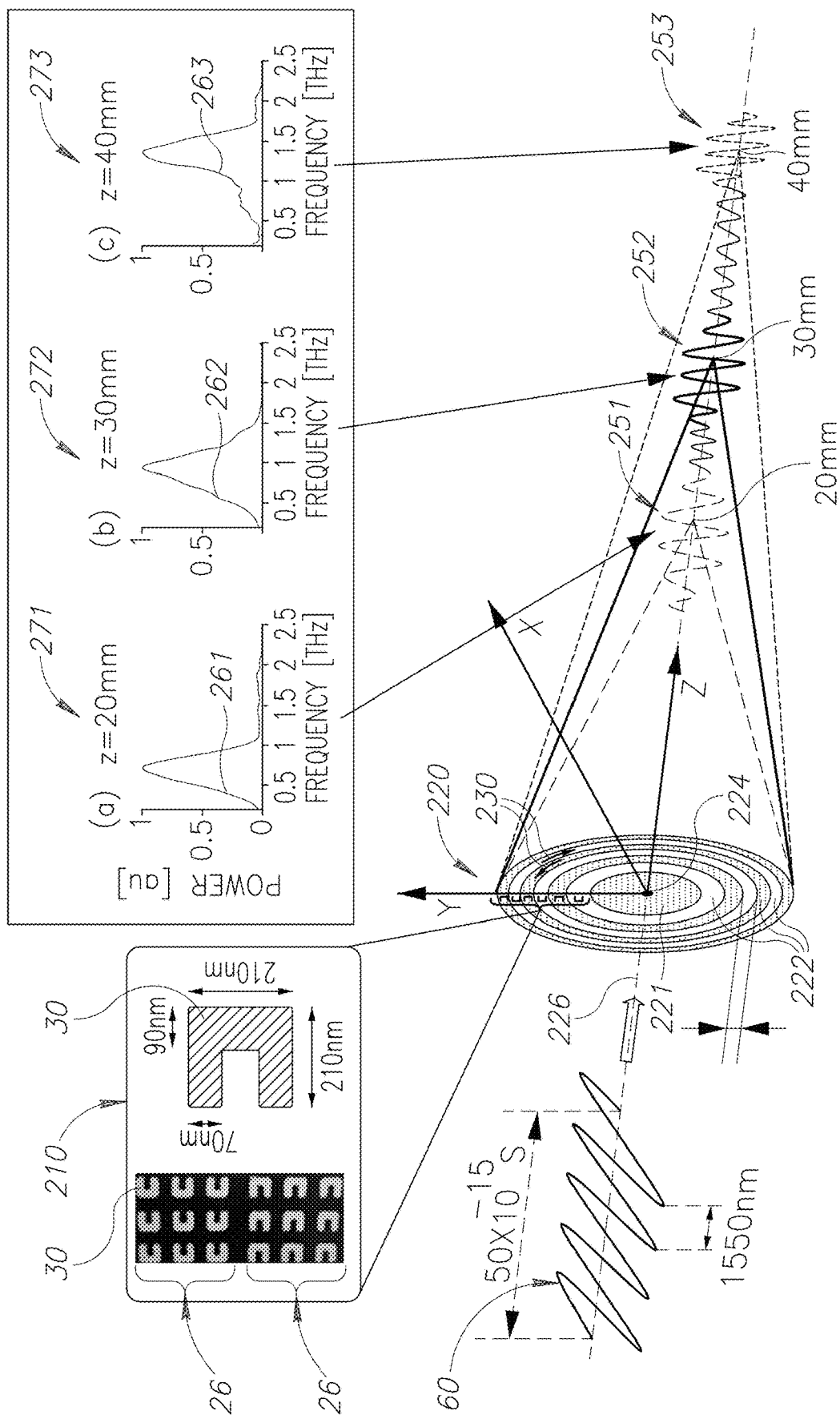
FIG. 3 schematically shows a NLM-FZP being excited by a NIR femtosecond pump pulse to generate a train of THz pulses characterized by different frequency spectra, in accordance with an embodiment of the disclosure.

FIG. 3 schematically shows an example embodiment of a non-rectilinear NLM 220, also referred to as a NLM-FZP 220, configured as a Fresnel zone plate and shown being excited by NIR pulse 60, in accordance with an embodiment of the disclosure.

NLM-FZP 220 has a central circular zone 221 empty of SRRs and a plurality of surrounding concentric, circular bands 222 of point antennas optionally U-SRRs 30. The U-SRRs in a same band 222 are, optionally, oriented in a same azimuthal direction relative to an optic axis 226 passing through a center 224 of the NLM-FZP. U-SRRs 30 in adjacent bands 222 are oriented optionally in opposite clockwise, counterclockwise directions. Orientation directions of U-SRRs 30 for two adjacent bands 222 are indicated by arrows 230. Details of U-SRRs 30 and portions of adjacent bands 222 in accordance with an embodiment are shown in an inset 210. The inset shows a schematic of a greatly enlarged U-SRR 30 on which optional dimensions of the U-SRRs are shown, and an image 225 of portions of adjacent bands 222 of U-SRRs 30 of an embodiment of NLM-FZP 220 produced in accordance with an embodiment of the disclosure.

When excited by an NIR pulse, such as NIR pulse 60, to radiate THz radiation, NLM-FZP 220 focuses THz radiation that it radiates substantially to a focal length "f" along optic axis 26 determined by radii of bands 222 and wavelength of the radiated THz radiation. For a given THz wavelength $\lambda_{THz}$ of the radiated radiation, the focal length f and radius $R_n$ of an n-th band in NLM-FZP 220 are related by an expression, $$R_n = [n\lambda_{THz} f + (n\lambda_{THz})/4]^{1/2}. \tag{20}$$

By way of a numerical example, an NLM-FZP similar to NLM-FZP 220 produced in accordance with an embodiment comprised bands determined so that f~30 mm for $\lambda_{THz}$ equal to about 0.3 mm. When excited by an NIR pulse similar to pulse 60, the NLM-FZP radiated three pulses 251, 252 and 253 of THz radiation schematically shown in FIG. 3. The pulses were focused substantially to distances, f, along optic axis 26 at 20 mm, 30 mm, and 40 mm respectively. Pulses 251, 252, and 253 had measured frequency spectrums 261, 262 and 263 by graphs 271, 272, and 273 respectively shown in an inset 270. Spectra 261, 262 and 263 had maxima at about 0.7, 1, and 1.4 THz respectively There is therefore provided in accordance with an embodiment of the disclosure apparatus for generating THz (terahertz) radiation, the apparatus comprising: a substrate; a planar array of asymmetric point antennas formed on the substrate and excitable by a pump pulse of radiation to radiate THz radiation the point antennas having characteristic dimensions substantially smaller than wavelengths of the radiated THz; wherein the array comprises point antennas aligned in different directions. Optionally a characteristic size of the point antennas is less than or equal to about 250 nm (nanometers), less than or equal to about 150 nm, or less than or equal to about 100 nm. Additionally or alternatively, the array may comprise different shape antennas. Additionally or alternatively, density of a density distribution of antennas in the array may be independent of location in the array.

In an embodiment the array comprises a rectilinear array of parallel rows and columns of same point antennas. Optionally, the point antennas in a same column face a same direction. Optionally, the array comprises groups of columns of point antennas wherein the point antennas in a same column group face a same direction and point antennas in adjacent column groups face different directions. Optionally, the array comprises a plurality of spatially sequential modulation cycles of column groups of point antennas, each cycle comprising two adjacent column groups of point antennas. Each of the plurality of cycles may have a same spatial period. Optionally the spatial period is equal to about 1 mm.

In an embodiment the array comprises a plurality of concentric circles of same point antennas. Optionally, the array comprises groups of adjacent concentric circles of point antennas in which each antenna in a same group faces a same direction relative to a respective radial direction to the antenna. Optionally, for adjacent groups of concentric circles of point antennas, the point antennas in one of the groups face a first direction relative to their associated radial directions and the point antennas in the other group face a different direction relative to their respective radial directions.

In an embodiment of the disclosure, the asymmetric point antennas are split ring resonators that exhibit surface plasmon resonances when illuminated by a pump pulse of near infrared radiation. Optionally, the split ring resonators are U shaped.

There is also provided a THz spectrometer in accordance with an embodiment, the embodiment comprising: an NLM according to an embodiment of the disclosure; and a source of near infrared (NIR) radiation oriented to illuminate the NLM with pulses of NIR radiation that excite point antennas in the array of the NLM to radiate THz radiation. Optionally, the pulses have temporal duration less than or equal to about 100 fm (femtoseconds), less than or equal to about 75 fm, or less than or equal to about 50 fm. Additionally or alternatively, the pulses may have a pulse energy less than or equal to about 5 mJ (millijoules), 4 mJ or 3.5 mJ. The source of radiation may comprise a laser and an optical parametric amplifier that receives light from the laser at a first frequency and radiates light at a second frequency less than the first frequency.

There is further provided in accordance with an embodiment of the disclosure, a method of providing a non-linear metasurface (NLM) comprising an array of point antennas excitable by a pump pulse of radiation to radiate THz radiation of a given spatiotemporal configuration to a far field of the NLM, the method comprising: determining a first Fourier transform equal to a Fourier transform of the spatiotemporal THz radiation for a time shift $t_o$ equal to a time it takes light to propagate from the NLM to a location having coordinates (x,z) where z is a distance along an optical axis of the NLM and x is a distance perpendicular to z; determining a second Fourier transform equal to a Fourier transform of a time dependence of an electric field generated by a point antenna in the array responsive to the pump pulse for the time shift $t_o$ and a time equal to (x/c)sin θ where θ=arctan(x/z) and c is the speed of light; determining a spatial function equal to a quotient equal to the first Fourier transform divided by the second Fourier transform; and using the spatial function to configure the array.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to persons of the art. The scope of the invention is limited only by the claims.

The invention claimed is:

1. Apparatus for generating THz (terahertz) radiation, the apparatus comprising:
    a substrate;
    a planar array of asymmetric point antennas formed on the substrate and excitable by a pump pulse of radiation to radiate THz radiation, the point antennas having characteristic dimensions substantially smaller than wavelengths of the radiated THz; wherein
    the array comprises point antennas aligned in different directions.

2. The apparatus according to claim 1 wherein a characteristic size of the point antennas is less than or equal to about 250 nm (nanometers), less than or equal to about 150 nm, or less than or equal to about 100 nm.

3. The apparatus according to claim 2 wherein the array comprises different shape antennas.

4. The apparatus according to claim 1 wherein density of a density distribution of antennas in the array is independent of location in the array.

5. The apparatus according to claim 2 wherein the array comprises a rectilinear array of parallel rows and columns of same point antennas.

6. The apparatus according to claim 5 wherein the point antennas in a same column face a same direction.

7. The apparatus according to claim 6 wherein the array comprises groups of columns of point antennas wherein the point antennas in a same column group face a same direction and point antennas in adjacent column groups face different directions.

8. The apparatus according to claim 7 wherein the array comprises a plurality of spatially sequential modulation cycles of column groups of point antennas, each cycle comprising two adjacent column groups of point antennas.

9. The apparatus according to claim 8 wherein each of the plurality of cycles has a same spatial period.

10. The apparatus according to claim 9 wherein the spatial period is equal to about 1 mm.

11. The apparatus according to claim 1 wherein the array comprises a plurality of concentric circles of same point antennas.

12. The apparatus according to claim 11 wherein the array comprises groups of adjacent concentric circles of point antennas in which each antenna in a same group faces a same direction relative to a respective radial direction to the antenna.

13. The apparatus according to claim 12 wherein for adjacent groups of concentric circles of point antennas, the point antennas in one of the groups face a first direction relative to their associated radial directions and the point antennas in the other group face a different direction relative to their respective radial directions.

14. The apparatus according to claim 1 wherein the asymmetric point antennas are split ring resonators that exhibit surface plasmon resonances when illuminated by a pump pulse of near infrared radiation.

15. The apparatus according to claim 14 wherein the split ring resonators are U shaped.

16. A THz spectrometer comprising:
an NLM (non-linear metasurfaces) according to claim 1; and
a source of near infrared (NIR) radiation oriented to illuminate the NLM with pulses of NIR (near infrared) radiation that excite point antennas in the array of the NLM to radiate THz radiation.

17. The THz spectrometer according to claim 16 wherein the pulses have temporal duration less than or equal to about 100 fm (femtoseconds), less than or equal to about 75 fm, or less than or equal to about 50 fm.

18. The THz spectrometer according to claim 16 wherein the pulses have a pulse energy less than or equal to about 5 mJ (millijoules), 4 mJ or 3.5 mJ.

19. The THz spectrometer according to claim 16 wherein the source of radiation comprises a laser and an optical parametric amplifier that receives light from the laser at a first frequency and radiates light at a second frequency less than the first frequency.

20. A method of providing a non-linear metasurface (NLM) comprising an array of point antennas excitable by a pump pulse of radiation to radiate THz radiation of a given spatiotemporal configuration to a far field of the NLM, the method comprising:
determining a first Fourier transform equal to a Fourier transform of the spatiotemporal THz radiation for a time shift $t_o$ equal to a time it takes light to propagate from the NLM to a location having coordinates (x,z) where z is a distance along an optical axis of the NLM and x is a distance perpendicular to z;
determining a second Fourier transform equal to a Fourier transform of a time dependence of an electric field generated by a point antenna in the array responsive to the pump pulse for the time shift $t_o$ and a time equal to $(x/c)\sin\theta$ where $\theta=\arctan(x/z)$ and c is the speed of light;
determining a spatial function equal to a quotient equal to the first Fourier transform divided by the second Fourier transform; and
using the spatial function to configure the array.

* * * * *